UNITED STATES PATENT OFFICE.

EBENEZER KENNARD MITTING, OF BROOKLYN, NEW YORK, ASSIGNOR TO JOSEPH GLATZ, OF SAME PLACE, AND ALBERT DOMEIER, OF LONDON, ENGLAND.

PROCESS OF RECOVERING GLYCERINE FROM SPENT SOAP-LYES.

SPECIFICATION forming part of Letters Patent No. 385,367, dated July 3, 1888.

Application filed September 15, 1887. Serial No. 249,761. (No model.)

*To all whom it may concern:*

Be it known that I, EBENEZER KENNARD MITTING, of Brooklyn, Kings county, New York, have invented Improvements in the Treatment of Spent Soap-Lye and the Recovery of Glycerine Therefrom, of which the following is a specification.

The object of my invention is to recover crude glycerine from spent soap-lye.

In carrying out my invention I proceed as follows: I first take the spent soap-lye and filter or decant, if necessary, to remove any suspended impurities. I next convey such lye to a suitable tank and neutralize any free alkali it may contain with hydrochloric acid, and then heat the lye so neutralized up to about 80° centigrade to expel carbonic acid and coagulate albuminous impurities. I then add a small proportion of a soluble salt, of barium or strontium; by preference I use the chloride of barium. The proportion of such salt will vary according to the quality and character of the spent lye; but in most cases from one-tenth to one-quarter of one per cent. of chloride of barium is sufficient. The salt is dissolved and intimately mixed with the spent lye. I now add sulphuric acid until no further turbidity or precipitate is produced. The precipitate, which consists of the fatty, resinous, and other impurities from the spent lye, combined mechanically with sulphate of baryta, (or sulphate of strontia, if a salt of strontium has been used,) quickly settles to the bottom of the tank. Thus, by using a soluble salt and adding the sulphuric acid, I produce in the lye itself an insoluble powder—namely, sulphate of baryta, which is the mechanical carrier of the precipitate from the lye. By thus producing the insoluble powder in the lye, I obtain it in the finest and most effective condition—finer, indeed, than could be made by hand or machinery. I next draw off the lye to another tank and neutralize with an alkali—by preference carbonate of soda—allowing any further precipitate to settle. I then draw off the clear lye, and concentrate it by boiling in a suitable vessel until the temperature reaches about 150° centigrade. During such concentration chloride of sodium is deposited. This I remove from the liquor in any convenient manner, and it may be washed and otherwise purified and used again in the manufacture of soap. The remaining product is crude glycerine of superior quality and fit for distillation without further treatment.

The precipitate of sulphate of baryta (or strontia) and organic impurities can be reconverted into chloride or other soluble salts of barium by means well-known to chemists, and used again, or it may be purified by washing with alkali, and used for a variety of purposes.

Having now described my invention, what I claim is—

1. The process herein described of treating lye for the recovery of glycerine, which consists in first adding acid to neutralize any free alkali, then heating the lye, and in then adding a soluble salt, of barium or strontium, and, finally, sulphuric acid, as set forth.

2. The process herein described of treating lye for the recovery of glycerine, which consists in adding thereto a soluble salt of barium, and in then adding suphuric acid and producing in the lye the insoluble sulphate of baryta, which constitutes a mechanical carrier of the precipitate in the lye, as set forth.

3. The process herein described of recovering glycerine from lye, which consists in first adding acid to neutralize any free alkali, next adding a soluble salt of barium, then adding sulphuric acid, then an alkali, and, finally, concentrating the remaining liquid by boiling, as set forth.

EBENEZER KENNARD MITTING.

Witnesses:
T. F. BOURNE,
HARRY M. TURK.